United States Patent
Seo et al.

(10) Patent No.: US 10,196,092 B2
(45) Date of Patent: Feb. 5, 2019

(54) STRUCTURE FOR FIXING MOTOR VEHICLE ROOF MODULE

(71) Applicant: POSCO, Pohang-si, Gyeongsangbuk-do (KR)

(72) Inventors: Min-Hong Seo, Pohang-si (KR); Mok-Young Lee, Pohang-si (KR); Kanghwan Ahn, Pohang-si (KR); Ju-Hyung Kim, Pohang-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 0 days.

(21) Appl. No.: 14/758,223

(22) PCT Filed: Dec. 24, 2013

(86) PCT No.: PCT/KR2013/012115
§ 371 (c)(1),
(2) Date: Jun. 26, 2015

(87) PCT Pub. No.: WO2014/104716
PCT Pub. Date: Jul. 3, 2014

(65) Prior Publication Data
US 2015/0344075 A1    Dec. 3, 2015

(30) Foreign Application Priority Data
Dec. 28, 2012    (KR) .......... 10-2012-0155746

(51) Int. Cl.
*B62D 25/06*    (2006.01)
*B62D 27/02*    (2006.01)
(Continued)

(52) U.S. Cl.
CPC .......... *B62D 25/06* (2013.01); *B62D 27/02* (2013.01); *B62D 29/008* (2013.01); *B62D 29/04* (2013.01)

(58) Field of Classification Search
CPC ........ B62D 25/06; B62D 27/02; B62D 29/04; B62D 29/008
(Continued)

(56) References Cited

U.S. PATENT DOCUMENTS 7,182,381 B2 *  2/2007  Ogawa .................. B62D 27/00
                                                        296/210
2004/0113465 A1  6/2004  Wieschermann et al.
(Continued)

FOREIGN PATENT DOCUMENTS

CN           1608923        4/2005
DE    102010044714 A1       5/2011
(Continued)

OTHER PUBLICATIONS

International Search Report issued in International Application No. PCT/KR2013/012115 dated Apr. 1, 2014, with English Translation.
Extended European Search Report dated Oct. 12, 2016 issued in European Patent Application No. 13868383.4.

*Primary Examiner* — Joseph D. Pape
*Assistant Examiner* — Dana D Ivey
(74) *Attorney, Agent, or Firm* — McDermott Will & Emery LLP (57) ABSTRACT

The present invention is a structure for fixing a roof module of a vehicle, which is improved to insert and fix a polymer panel for a joining between a vehicle body structure as a steel structure and a component made of a material other than steel. The present invention provides a structure for fixing a roof module of a vehicle, comprising: a roof rail of a vehicle; a roof panel made of a material different from that of the roof rail, which is fixed at the roof rail; a polymer member coupled between the roof rail and the roof panel; and a joint member which joins the roof rail, the roof panel, and the polymer member.

6 Claims, 6 Drawing Sheets

(51) Int. Cl.
*B62D 29/04* (2006.01)
*B62D 29/00* (2006.01)

(58) Field of Classification Search
USPC .......................................................... 296/210
See application file for complete search history.

(56) References Cited

U.S. PATENT DOCUMENTS

| | | | |
|---|---|---|---|
| 2005/0242550 A1* | 11/2005 | MacNee | B60J 7/1252 280/730.2 |
| 2011/0080024 A1 | 4/2011 | Mihai | |
| 2014/0123495 A1 | 5/2014 | Hill et al. | |
| 2015/0137563 A1* | 5/2015 | Eberle | B60R 9/04 296/215 |

FOREIGN PATENT DOCUMENTS

| | | |
|---|---|---|
| FR | 2924400 A1 | 6/2009 |
| JP | 2003-031205 A | 1/2003 |
| JP | 2004-130986 A | 4/2004 |
| JP | 2007-113083 A | 5/2007 |
| JP | 2008-006465 A | 1/2008 |
| JP | 2009-040137 A | 2/2009 |
| JP | 2009-269071 A | 11/2009 |
| JP | 2009-269401 A | 11/2009 |
| JP | 2009-279605 A | 12/2009 |
| JP | 2010-082692 A | 4/2010 |
| JP | 2012-001142 A | 1/2012 |
| KR | 10-2010-0056402 A | 5/2010 |

\* cited by examiner

{Fracture surface}

STRUCTURE FOR FIXING MOTOR VEHICLE ROOF MODULE

RELATED APPLICATIONS

This application is a national phase of International Application No. PCT/KR2013/012115, filed on Dec. 24, 2013, which in turn claims the benefit of Korean Application No. 10-2012-0155746, filed on Dec. 28, 2012, the disclosures of which Applications are incorporated by reference herein.

FIELD OF THE INVENTION

The present invention relates to a structure for fixing a roof module of a vehicle, and more particularly the structure for fixing a roof module of a vehicle is improved to insert and fix a polymer panel for a joining between a vehicle body structure which is a steel structure and a component made of a material other than steel.

DESCRIPTION OF THE RELATED ART

Recently, in the automobile industry, designs where lightweight materials such as an aluminum alloy, a magnesium alloy, a carbon fiber reinforced plastic are applied to a vehicle body structure to increase fuel efficiency have attracted many attentions, and a number of patents in the related art have been filed. In particular, as a regulation of $CO_2$ emissions in the automobile industry is actualized, designs to which lightweight materials are applied are required in a body of the typical commercial vehicle.

Furthermore, in Europe, $CO_2$ emissions must meet 120 g/km by 2016, and moreover the $CO_2$ emissions must meet 95 g/km by 2020. If individual vehicle companies do not meet such a regulation of $CO_2$ emissions, the company is subject to a fine (tax) such as environmental charges which causes unfavorable situations in competition in the market. Thus, the individual vehicle companies urgently have to develop technology of lightweight vehicle body to satisfy fuel efficiency regulations.

Currently, designs of a lightweight vehicle body are limitedly applied to extremely expensive low-volume production models (e.g., Porche, Ferrari, Audi R8, Jaguar XF, etc.) or special purpose models (e.g., F1 racing machines, etc.). These designs mostly rely on hand and prepared by a special work process tailored to the vehicle structure.

For the lightweight material design, there are technically specialized processes as in the above example. However, these processes cannot be used in general commercial vehicles, because the processes cannot be applied to the mass production process and the technology cost is very high.

The reason for applying the steel to the vehicle body is to achieve high productivity because the steel has a lower material cost compared to other lightweight materials and it is possible to automate the assembly process.

On the other hand, in the model such as Audi R8, since most of its parts are made of aluminum material, so its vehicle body is assembled by the same material. As a result, in case of joining and fixing of the component, a variety of methods such as welding can be applied. However, the cost of materials is very expensive, so the vehicle body manufacturing cost increases.

Thus, in case of the commercial vehicle developed for the purpose of mass production, a design using hybrid materials in which most of the rigid structure uses the steel and a portion is replaced to a lightweight material is preferred to reduce the manufacturing cost.

However, the joining of steel and materials other than the steel has a technical limitation in which the welding technology using a melting cannot be used due to the difference in physical properties of most materials. In particular, in case of lightweight metallic materials such as an aluminum alloy or a magnesium alloy, when the lightweight metallic material is directly contacted with the steel, it causes severe galvanic corrosion. Thus, even if there will be possible to use the welding, the welding cannot be available due to weak corrosion resistance.

To overcome the problem, a variety of mechanical joining technique has been developed. However, most cases are implemented by handwork, so the joining of steel and materials other than the steel is unfavorable to the automation and is not suitable for mass production.

Normally, in case of the mass-produced vehicle body, such joining should be possible for automation for mass production and not be required for the high cost for the joining.

Figure 1:
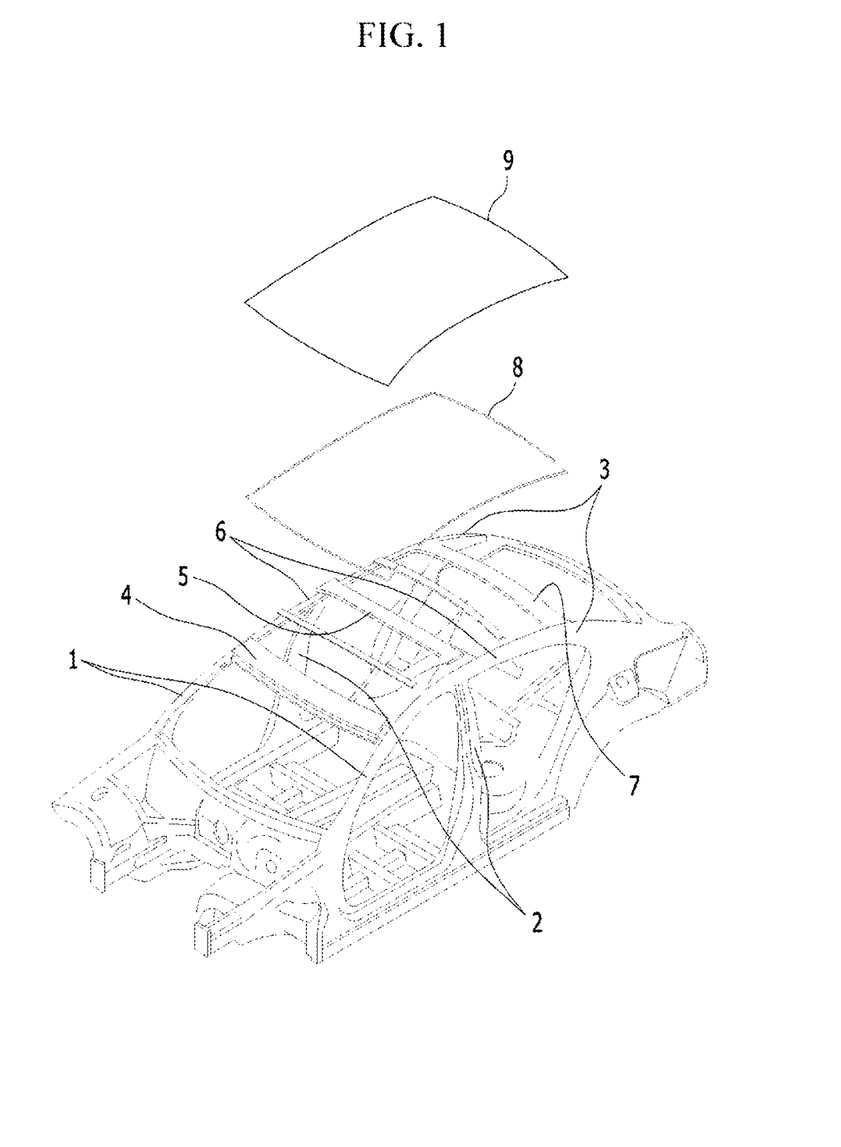
FIG. 1 is a perspective view showing a configuration of a roof module and a joining position with the vehicle body.

On the other hand, a roof module of vehicle, as shown in FIG. 1, is mounted on a rectangular structure consisting of each A/B/C pillar (1, 2, 3) as an upper structure of vehicle, a roof rail (6), and each front/center/rear roof cross member (4, 5, 7).

In addition, a steel is joined to the upper structure of the vehicle body through a spot welding. To be watertightness, a sealer is applied between the roof module and the vehicle body, and finishing is performed by a rubber material mold.

In some cases, end of the roof module and the steel vehicle body is processed by LBW (Laser Beam Welding), GMAW (Gas Metal Arc Welding), or brazing, and the welded bead portion is finished through a sanding process. As described above, in the case of steel roof module, a welding is used as a basic joining method.

On the other hand, in case of the roof module made of the aluminum alloy, if the vehicle body is manufactured by the same aluminum ally, LBW is preferred. When assembled to the steel vehicle body, a joining is performed by applying a structural adhesive between the steel vehicle body and the aluminum roof module.

In this case, it is common practice to fix the roof module to the steel vehicle body during the firing of the structural adhesive, a mechanical joint such as a rivet or a clinching is implemented at about 100-200 mm intervals.

In case of the roof module made of the magnesium alloy, it can be joined in the same manner as the aluminum alloy, however, a rivet subjected to mechanical joining acts as a bridge which is electrically connects the magnesium and the steel. As a result, galvanic corrosion condition occurs, so corrosion resistance becomes weak.

In case of the clinching, the magnesium alloy cannot be implemented because of low formability at room temperature.

Figure 2:
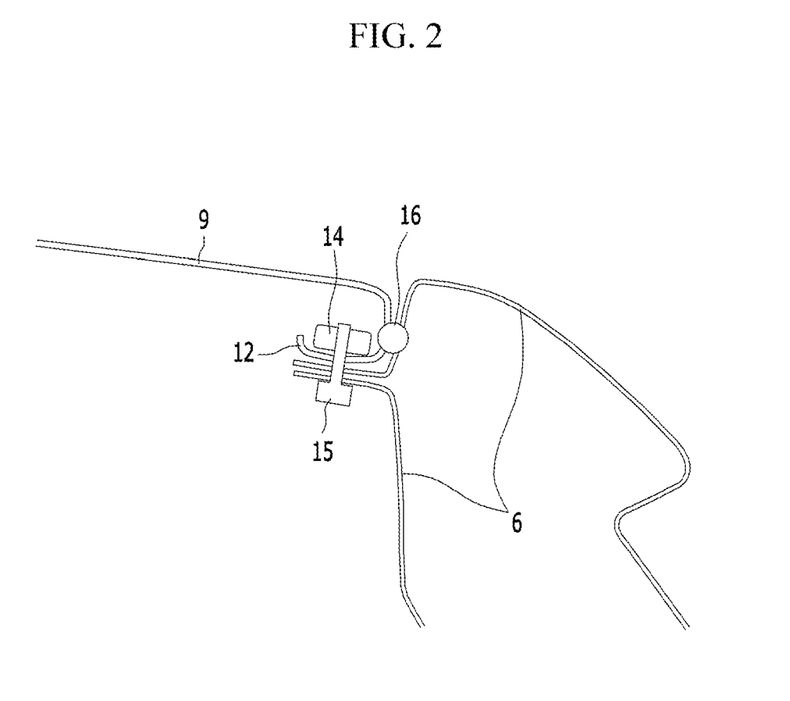
FIG. 2 is a cross-sectional view showing a conventional joining method of a roof module in TKS/MgF.

TKS/MgF Corporation proposed a technique as shown in FIG. 2 to join a magnesium roof module.

In this technique, a fundamental joining strength was implemented through a structural adhesive (16). A face at which an outer flange of the roof module and a vehicle body roof rail (6) meet was inclined so that a roof module was fitted thereto as a customized wedge shape, and the adhesive was applied to between the roof rail and the roof module to secure the joining strength and the watertightness.

At this time, a bolt coupling structure was proposed as a way of securing the roof module to the vehicle body. According to that, an undercut (12) was made by being bent the outer flange of the roof panel (9) toward the center, and a casting or machine-processed bulk shaped insert (14) was inserted inside the undercut (12). After that, the insert (14), the undercut (12), and the roof rail (6) were fixed by a bolt (15) under the vehicle body.

In the above described method, a complex manufacturing process such as the number of a phase molding to implement a shape of undercut (12) of the roof panel (9) is required. Furthermore, since a coupling of the bolt (15) to fix the roof module is required that a worker enters under the vehicle body and couples the bolt toward the upward direction, thus a workability is not easy and automation is not available.

Moreover, even though an area coupled with the bolt (15) is located in the undercut (12) area which can block the external fluid such as a rainwater, the structure cannot be free from the galvanic corrosion because the area is not electrically insulated with the steel vehicle body.

CONTENTS OF THE INVENTION

Problem to be Solved

The present invention has been made to solve the above problem, and the purpose of the present invention is to provide a structure for fixing a roof module of vehicle, which can realize a vehicle body assembly automation process of the roof module without changing the existing production facilities by attaching the polymer panel to the flange extension part through a press processing process, by joining with the vehicle body through the LBW method, and by partly allowing a rivet with an insulated structure to be coupled.

Means for Solving Problem

A structure for fixing a roof module of vehicle according to the present invention to achieve the purpose as described above, comprising: a roof rail of a vehicle; a roof panel made of a material different from that of the roof rail, which is fixed at the roof rail; a polymer member coupled between the roof rail and the roof panel; and a joint member joining the roof rail, the roof panel, and the polymer member.

In the present invention, the polymer member includes a polymer plate, and the polymer plate placed between the roof panel and the roof rail is joined by a laser beam welding.

The joint member includes a rivet, and a diameter (D) of the rivet hole of a flange of the roof module is formed as D=(a diameter of the rivet+0.6).

The polymer member has a protrusion by being extruded through a press processing. The protrusion is placed between the rivet and the roof module by being transformed during a riveting of the rivet, which electrically insulates the rivet and the roof module.

Furthermore, a fixed joining surface of the roof rail is heated to a temperature of 150 to 200° C. The polymer member is made of a thermoplastic polymer containing polycarbonate, and the roof panel is made of a material which is lighter than Fe.

Effects of the Invention

According to an embodiment of the present invention, a molding step can be reduced due to a simple processing of the roof panel since it is possible to configure the shape of the roof panel as the undercut free type.

Furthermore, a galvanic corrosion can be fundamentally prevented because the roof module and the vehicle body are electrically insulated by inserting the polymer member, and a mechanical coupling member such as a rivet is also electrically insulated.

In addition, there is no need to new equipment investment because the present invention can be used in conventional automated production equipment without additional handworks. Thus, the present invention is possible to prevent an increase in production costs caused by new equipment investment since new equipment investment is not required. Moreover, the present invention can be directly applied to the process for mass production.

BRIEF DESCRIPTION OF THE DRAWINGS

FIG. 5 (a) is a schematic view of magnesium-polymer fusion by LBW, (b) is a chart showing a joining strength, and (c) is a picture of a fracture surface.

DETAILED DESCRIPTION

Hereinafter, preferred embodiments of the present invention will be described in detail with reference to the accompanying drawings.

Figure 3:
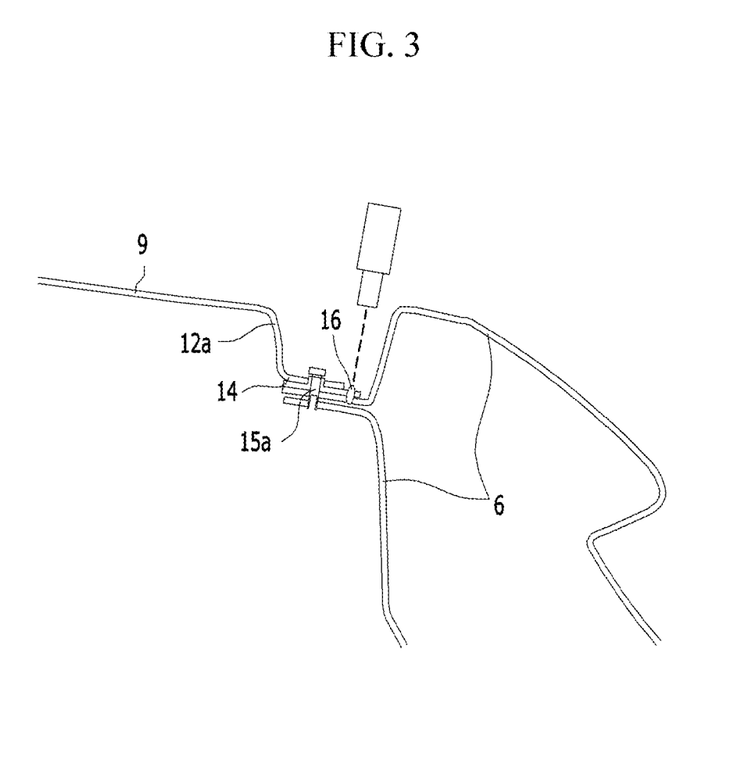
FIG. 3 is a cross-sectional view showing a joining method of a roof module according to an embodiment of the present invention.

FIG. 1 is a perspective view showing a configuration of a roof module and a joining position with the vehicle body, and FIG. 3 is a cross-sectional view in which a structure for fixing a roof module of a vehicle according to the present invention.

Figure 4:
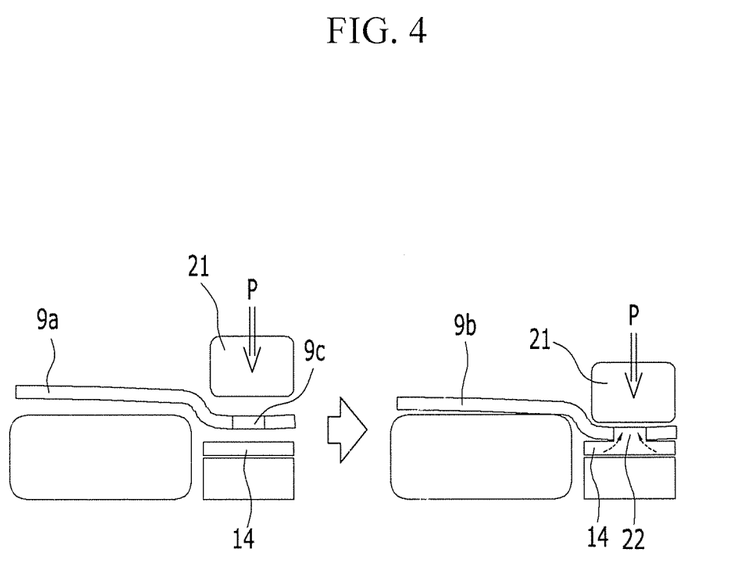
FIG. 4 is a cross-sectional view showing a modification of a polymer panel extruding and protruding toward a rivet hole of a roof panel through a press processing predicted by the numerical analysis according to an embodiment of the present invention.

In addition, FIG. 4 is a cross-sectional view showing a modification of a polymer panel extruding and protruding toward a rivet hole of a roof panel through a press processing predicted by the numerical analysis according to an embodiment of the present invention.

First, referring to FIG. 1 and FIG. 3, a structure for fixing a roof module of vehicle according to the present invention, comprising: a roof rail (6) of a vehicle; a roof panel (9) made of a material different from that of the roof rail (6), which is fixed at the roof rail (6); a polymer member coupled between the roof rail (6) and the roof panel (9); and a joint member joining the roof rail (6), the roof panel (9), and the polymer member.

The polymer member includes a polymer plate (14). The polymer plate (14) is placed between the roof panel (9) and the roof rail (6), and which is joined by a laser beam welding (LBW).

Furthermore, the joint member includes a rivet (15a), and a diameter (D) of the rivet (15a) hole of a flange of the roof module is formed as D=(a diameter of the rivet (15a)+0.6).

Moreover, the polymer member has a protrusion by being extruded through a press processing. The protrusion is placed between the rivet (15a) and the roof module by being transformed during a riveting of the rivet (15a), which electrically insulates the rivet (15a) and the roof module.

A fixed joining surface of the roof rail (6) is heated to a temperature of 150 to 200° C.

In addition, the polymer member is made of a thermoplastic polymer containing polycarbonate, and the roof panel (9) is made of a material which is lighter than Fe (e.g., composite of magnesium and carbon fiber).

Moreover, as described in FIG. 4, a roof panel (9) is fused and joined with a polymer plate (14) as the polymer member though melting and cooling, and the polymer plate (14) is joined by a extrusion and a fusion caused by a press.

The structure for fixing a roof module of a vehicle according to the present invention as described above will be more specifically described.

First, referring to FIG. 1 and FIG. 3, in a roof module applied to the present invention, a polymer plate (14) consisting of a polymer member is used as a joint member to fuse and join the roof module to the steel vehicle body. Thus, even though a roof panel (9) as the unit part with a different material and a roof rail (6) as a welding object have different materials, the roof module of the present invention can be applied to an automated process.

For this purpose, the polymer plate (14) is applied to a position corresponding to the fusion joined part of the roof panel (9), and a rivet joining structure to fix the roof panel (9) made of a material different from that of the roof rail (6) is applied thereto.

Moreover, as described in FIG. 4, a diameter (D) of the rivet (15a) hole (9c) located in the rivet joining structure of the flange of the roof module is processed and formed as D=(a diameter of the rivet+0.6).

When the hole (9c) is larger than the diameter of the rivet (15a), a protrusion (22) of the polymer plate (14) which is extruded through a press (21) processing is transformed during a riveting and placed between the rivet (15a) and the roof module. In addition, the protrusion (22) electrically insulates the rivet (15a) and the roof module.

Moreover, as shown in FIG. 4, the rivet hole (9c) is located in an extension part of a hot roof panel (9a), as a press plate, which is heated to the temperature of 150 to 200° C. In other words, the polymer plate (14) is located at a position corresponding to the fusion joined part of the roof panel (9), and the rivet hole (9c) is contacted with the surface of the polymer plate (14) by a press processing. At this time, some part of the contact part is melted, pressed toward the direct way of the press, and protruded toward the inside of the hole. Thus, the inner space of the hole can be filled with a polymer member.

In FIG. 3, reference numeral 12a indicates an overcut, and in FIG. 4, reference numeral 9b indicates a cool roof panel.

Furthermore, the polymer plate (14) located at the position corresponding to the fusion joined part of the roof panel (9) has a surface contact with the surface of the welded roof rail (6) by being mounted on the roof rail (6).

At this time, as shown in FIG. 3, the surface of the roof rail (6) is heated by applying the laser beam welding (LBW) passing through the polymer plate (14), thus the immediately above polymer plate (14) is melted and fused to the surface of the heated roof rail (6).

Preferably, to obtain a sufficient joining strength, the fixed joining surface of the roof rail (6) should be heated to a temperature of 150 to 200° C.

Moreover, in the position corresponding to the fusion joined part of the roof panel (9), a gap from the outermost end part of the roof panel (9) to the nearest vertical surface of the welded roof rail (6) which is extended in parallel from the polymer plate (14) must be greater than [(the width of the roof panel (9)×the thermal expansion coefficient of the material of the roof panel (9)×the firing temperature of the paint)/2], preferably the gap is required at a minimum of 3 mm.

Furthermore, the free gap provides an open surface extended from the outermost end part of the roof panel (9), which is parallel extended along the polymer plate (14) by allowing the laser beam to be transmitted through the roof panel (9). Especially, the free gap provides a space so that the roof panel (9) is smoothly expanded and transformed while the roof panel (9) is coupled to the vehicle body in the paint firing process, as a result, which can minimize the thermal residual stress by a linear thermal expansion caused from the type of material differences with the welded roof rail (6).

Figure 5:
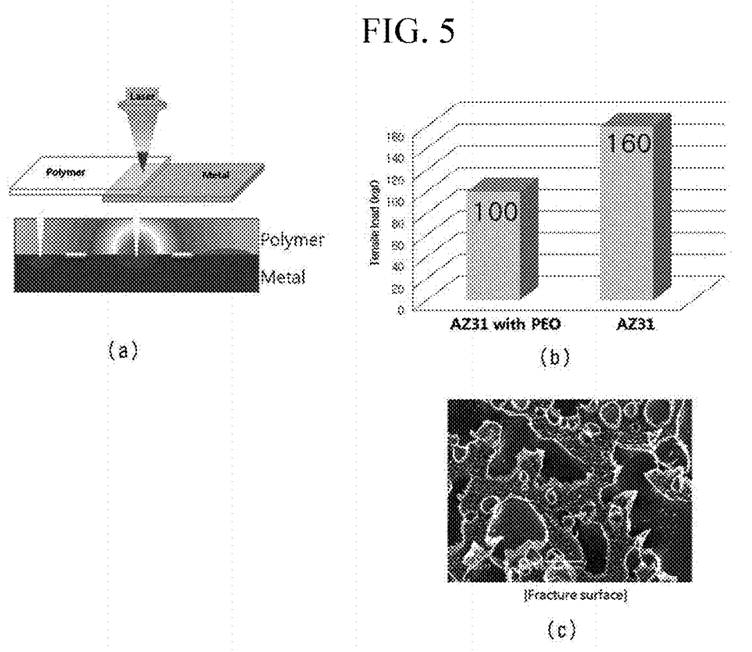

In (a), (b), (c) of FIG. 5, the concept of fusion of the polymer plate placed between the roof panel as a unit part of the roof module and the vehicle body by the laser welding and the joining strength are described.

Figure 6:
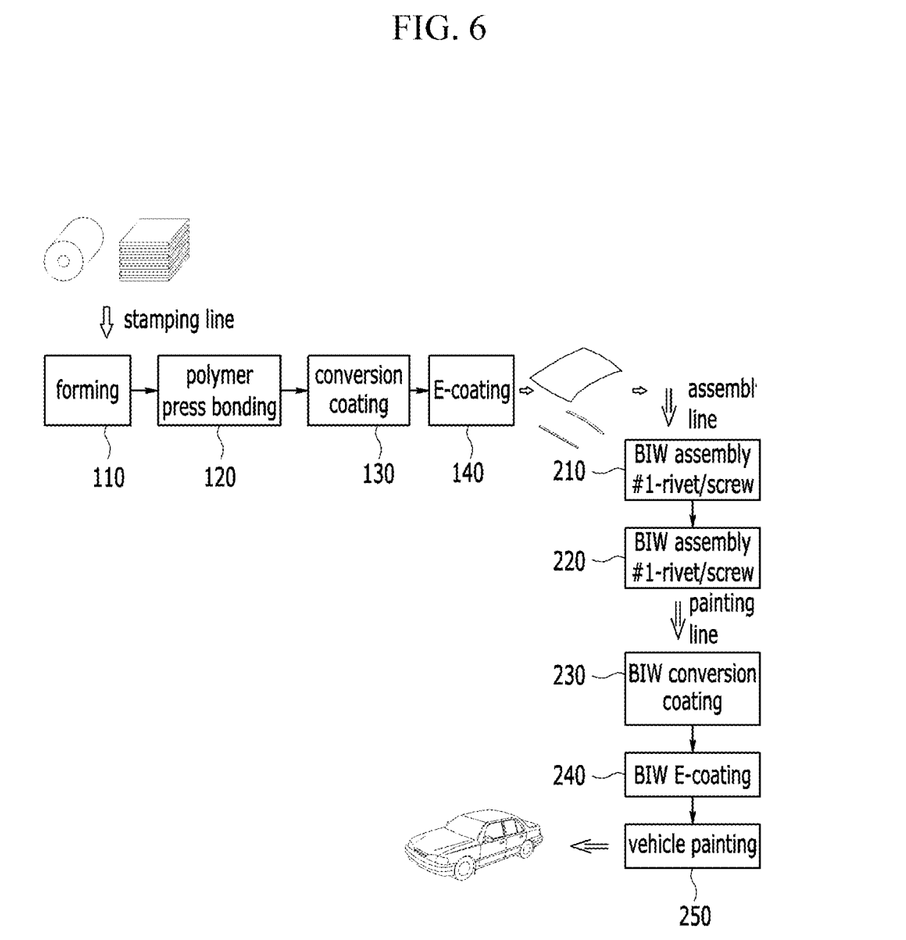
FIG. 6 is a process flow chart of a vehicle assembly to which the present invention is applied.

FIG. 6 is a flow chart of a vehicle body assembly process to which the present invention is applied.

Referring to FIG. 6, a vehicle body assembly process allows the roof panel (9) and the polymer plate (14) to be included in a forming process of the roof panel (9), thus a pressing pressure fusion molding can be performed as one step of a continuous molding process.

If the material of the roof panel (9) is a magnesium, a residual heat of the heated roof panel (9) can be used as the intermediate stage of the warm compaction process for conditions for processing the parts. Thus, the pressing pressure fusion molding can be performed without additional heating process.

In addition, the gap between the roof panel (9) and the polymer plate (14) has air-tightness by a process for fusion molding. The polymer material has an extremely low chemical reactivity and electrical conductivity, thus the surface modification coating of metal to improve the adhesion of the painting can be applied directly.

At this time, a conversion treatment based on the chemical reaction and an electrochemical surface treatment such as PEO (Plasma Electrolytic Oxidation) based on an anodic oxidation by an electrode can all be utilized as the surface modification coating.

Moreover, a surface-modified processing part after being constituted as the roof panel (9) and the polymer plate (14) can form a coating layer of the surface of the painting base by a conventional electrodeposition coating, and the electrodeposition coated roof module can be introduced directly to the typical process of the vehicle body assembly.

Furthermore, the roof panel (9) and the polymer plate (14) maintain the original shape without any contaminants on the surface despite of the chemical and electrochemical surface modification, so the roof panel (9) and the polymer plate (14) introduce to the assembly process without a separate anti-corrosive treatment.

In addition, the roof panel (9) and the polymer plate (14), which are piled up on the conventional tray in a conveyor in which the semi-assembled vehicle is being transported, fix the electrodeposition coated component module by a jig. In this case, the roof panel (9) and the polymer plate (14) can be mounted on the semi-assembled vehicle by a robot.

At the same time, the polymer plate (14) which is formed as the roof panel (9) and the polymer member from the pneumatic press installed in the jig forcibly fixes the component module to the semi-assembled vehicle body by injecting the rivet into a hole which forms the rivet joining structure of the upper part.

Then, in the forcibly fixed component module, especially, in the outermost end part of the roof panel (9) corresponding to the fusion joined part of the roof panel (9), a fusion is performed by irradiating the laser beam toward immediately above the open polymer plate (14) located between the nearest vertical surface of the roof rail (6) which is extended in parallel from the polymer plate (14).

The post-process may follow the general process of the vehicle assembly lines. In particular, after the paint firing process at the temperature of 150 to 200° C., a surface in which the roof rail (6) and the polymer plate (14) which are not fused by being irradiated through the laser beam are contacted is itself fused by the melting and the cooling caused from the ambient temperature. Thus, the additional joining strength can be secured.

The operation method as described above is the technology used in the general vehicle assembly process. Thus, a person skilled in the art, who understands this present idea can know that there is no need to invest in special equipment and to design separate special mechanism to realize the above described embodiment.

As described above, it is possible to apply the existing process in the normal conditions without special modifications, so the investment of new equipment is unnecessary. As a result, the present invention can prevent an increase in production cost due to the investment in new equipment, and the present invention can be directly applied to the process for mass production.

Although, as described above, the present invention has been described with reference to an embodiment shown in the drawings, but it is merely thereof. Thus, those of ordinary skill in the art will appreciate that various modifications and equivalent embodiments are possible therefrom. Therefore, the true scope of the invention should be defined only by the appended claims.

DESCRIPTION OF REFERENCE NUMERALS

6: roof rail
9: roof panel
9*c*: rivet hole
14: polymer plate
15*a*: rivet
22: protrusion

The invention claimed is:

1. A structure for fixing a roof module of a vehicle, comprising:
   a roof rail of the vehicle;
   a roof panel made of a material different from that of the roof rail, the roof panel being fixed at the roof rail;
   a polymer member coupled between the roof rail and the roof panel, so that one side of the polymer member is in contact with the roof rail and another side of the polymer member is in contact with the roof panel; and
   a joint member joining the roof rail, the roof panel, and the polymer member,
   wherein the polymer member has a protrusion, which protrudes upwards,
   wherein the through hole is a rivet hole,
   wherein the protrusion protrudes into the rivet hole formed on the roof panel, and
   wherein the protrusion is disposed between the joint member and the roof module and electrically insulates the joint member and the roof module.

2. The structure of claim 1, wherein the polymer member includes a polymer plate, and the polymer plate placed between the roof panel and the roof rail is joined by a laser beam welding.

3. The structure of claim 1, wherein the joint member includes a rivet.

4. The structure of claim 3, wherein a diameter (D) of a rivet hole of a flange of the roof module is formed as D=(a diameter of the rivet+0.6).

5. The structure of claim 1, wherein the polymer member is made of a thermoplastic polymer containing polycarbonate.

6. The structure of claim 1, the material of the roof panel is lighter than Fe.

* * * * *